Oct. 23, 1934.   G. H. ROBERTS   1,978,061
PISTON RING
Filed Oct. 31, 1931   2 Sheets-Sheet 2

INVENTOR
George H. Roberts
BY
ATTORNEYS

Patented Oct. 23, 1934

1,978,061

UNITED STATES PATENT OFFICE 1,978,061

PISTON RING

George H. Roberts, Rock Island, Ill., assignor to American Trust Company, Davenport, Iowa, a corporation of Iowa, trustee Application October 31, 1931, Serial No. 572,280

2 Claims. (Cl. 309—32)

This invention, which is a continuation in part of my co-pending application Serial No. 212,560, filed August 12, 1927, relates to piston and packing ring assemblies for the main and valve cylinders of steam engines.

In steam engine practice, and particularly in those engines, such as locomotives, using piston valves to control the flow of steam to the main cylinder, cylinder wall pressures between, first, the piston valve packing rings and valve cage, and second, the main cylinder and piston packing ring, are created which are greater in magnitude than necessary to seal the existing steam pressure. The result is that these greater pressures cause unnecessary wear on both the cylinder or valve cage walls and the packing rings. These excessive pressures are the result of the combined forces arising from the snap or spring pressure of the packing rings and the pressure of the steam behind the ring. Cylinder wall pressures are, therefore, in no way controlled to obtain a minimum cylinder wall friction while maintaining an adequate but not excessive seal.

It is, therefore, one of the objects of the present invention to provide a piston and ring assembly for steam engines in which the pressure between the packing ring and surrounding cylinder wall or valve cage is of such magnitude as to maintain an adequate seal for steam pressure existing within the cylinders without excessive frictional engagement with the cylinder wall.

Another object is to provide a steam engine piston and ring assembly in which the expansion of the ring, and, therefore, the magnitude of frictional contact, is controlled at all times in order to avoid unnecessary high cylinder wall pressures, and thereby to increase the life and performance of the assembly as compared with conventional constructions.

Another object is to provide a steam engine piston and ring assembly which, during operation in an engine cylinder, adequately seals the steam pressures with a minimum of cylinder wall friction.

A further object is to provide a steam engine piston and ring assembly of such construction that steam pressures act radially and axially against the ring, and in which the radial expansion of the ring is resisted by frictional engagement with an inclined portion of the piston body.

A still further object is to provide a steam engine piston or piston valve and packing ring assembly in which the increased expansive tendency of the packing ring is modified in order to avoid excessive cylinder wall pressure.

With the above and other objects in view, which will be readily apparent from the following detailed description, the present invention consists in certain features of construction and combinations of parts that will be readily understood by those skilled in the art to which the invention appertains.

Briefly stated, the invention about to be described in detail contemplates the use of a packing ring having an inclined surface remote from the side against which the steam pressures act, which cooperates with a correspondingly inclined surface of the piston body. The ring is assembled in the piston with substantial axial and radial clearances with respect to the piston body so that the existing steam pressure may act both radially and axially against the ring and expand it against the frictional resistance created by the contact between the inclined surfaces of the ring and piston. The ring, because of the material axial clearance, has a tendency to float and properly align itself.

The invention may be incorporated in the main piston and in the piston valve as shown in the drawings of which Figure 1 is a section showing one arrangement of the main piston and cylinder and the piston valve which controls the supply of steam to and the discharge of steam from the main cylinder.

Referring to the accompanying drawings in which like numerals refer to like parts throughout the several views, I have shown in Figure 1 the relative positions of the steam chest, main cylinder, piston valve and the main piston of a steam engine, such as a locomotive.

Figure 1:
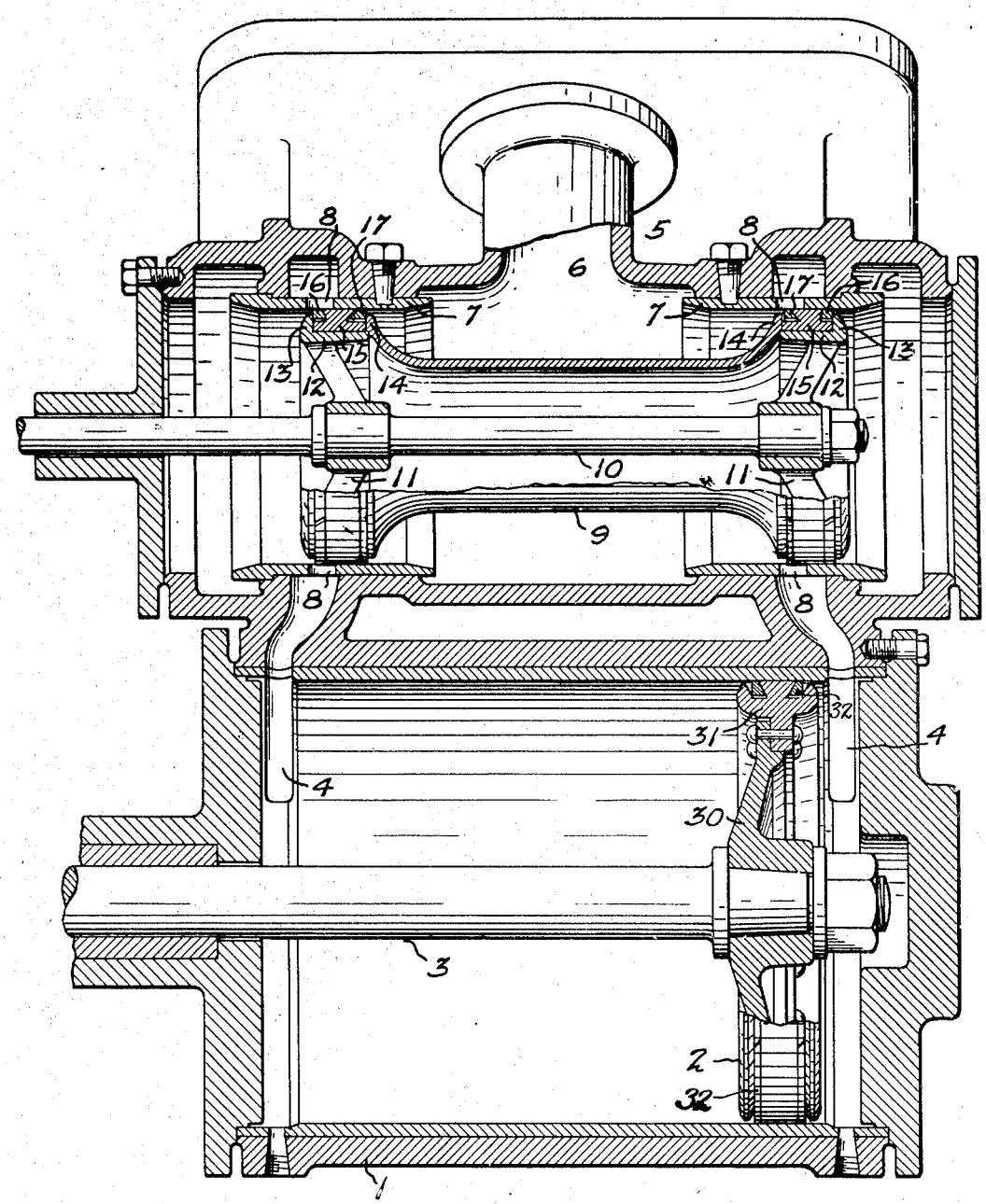

As shown in this view, the assembly comprises a main cylinder 1 having a piston 2 reciprocably mounted therein, the piston 2 being provided with a suitable drive rod 3. Steam is admitted into the ends of the main cylinder 1 at opposite sides of the piston through passageways 4 that lead from opposite ends of the steam chest 5. The steam chest is of a conventional type and has a central inlet 6 and cylindrical valve seats or cages 7, provided with ports 8 that communicate with the passageways 4. The ports 8 are alternately opened and closed by a conventional piston valve 9 which permits the flow of steam into one end of the main cylinder 1 during the exhaust of steam from the other end of the main cylinder.

Figure 3:
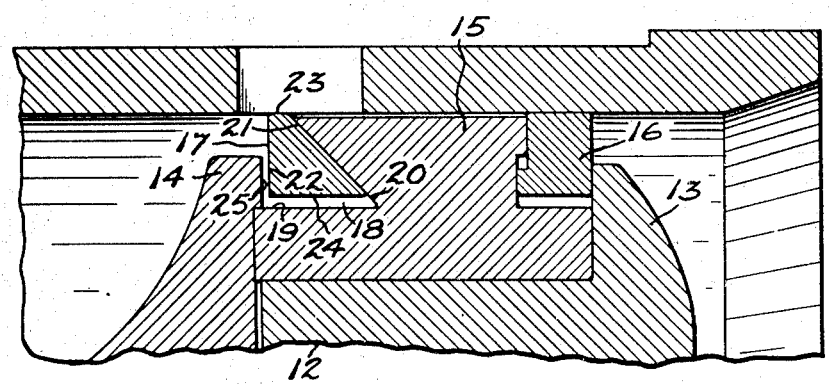
Figure 3 is a fragmentary enlarged section of a piston valve showing the cooperation between the packing ring and the piston valve proper.

Referring particularly to Figures 1 and 3, the piston valve 9 is mounted on a valve rod 10 by means of spiders 11, keyed to the rod 10 at opposite ends. Each spider is formed with a cylindrical portion 12 coaxial with the rod and an outwardly extending radial flange 13. The cylindrical body of the valve is clamped between the spiders 11 as shown and has annular shoulders 14 at its ends which have centering as well as thrust engagement with the cylindrical portion 12 of the spiders.

Surrounding the cylindrical portions 12 of each spider, and confined between the spider flange 13 and end of the valve body, is an annular bull ring 15 which forms a guide for that end of the valve in the seat or cage 7. The annular bull ring, which is continuous and substantially non-expansive, is held against rotation on its spider 11 in any suitable manner.

The piston valve is provided with two expansible rings at each end to provide seals between the valve and valve cages, the outermost ring 16 at each end being the exhaust ring and the innermost ring 17 at each end being the steam ring.

It is obvious that the purpose of the exhaust rings 16 is to prevent the leakage of steam between the exhaust sides of each valve cage 7 and the steam passageways, and that the purpose of the steam rings 17 is to prevent leakage of high pressure steam between the steam chest and the port 8 that is closed by the piston valve.

The present invention, as regards the piston valve described, extends primarily to the steam rings 17. The exhaust rings 16, as here shown, are of a conventional type and are mounted between the spider and flanges 13 and the bull ring 15 in recesses formed at the intersections of the outer lateral and circumferential faces of the bull ring and need not be further described.

The steam rings 17 are likewise mounted between the ends of the body of the piston valve and the bull rings 15 in suitable recesses 18 formed at the intersections of the inner lateral and circumferential faces of the bull rings 15. Each recess 18 includes a circumferential face 19 and a face 20 that is inclined outwardly toward the opposite end of the piston valve. It is to be noted, however, that the faces 25 of the shoulders 14 of the valve body are spaced axially inwardly from the outer marginal edges of the inclined faces 20 to provide spaces for the reception of the steam rings 17.

Each steam ring 17 is of the split type, having an inclined face 21 that substantially corresponds to the face 20 of the bull ring, a radial face 22 at the opposite side, a narrow outer circumferential face 23 and a wider inner circumferential face 24.

The ring 17 is mounted in its recess during the assembly of the piston valve parts described and material axial and radial clearances are maintained between the ring and the cooperating valve parts so that the ring may have side contact with either the inclined face 20 of the bull ring or the radial face 25 of the shoulders 14 of the piston valve body depending, of course, upon the action of the steam pressure and the direction of movement of the piston valve. The ring 17, therefore, has a floating action within its recess.

Steam pressures within the steam chest are practically constant. The steam acts both axially as well as radially against the ring by reason of the axial and radial clearances that are provided, with the result that the radial pressures assist in expanding the ring. The ring 17, however, is provided with some snap in order that it will circumferentially engage the wall of the surrounding cage. The outward expansion of the ring, caused by the initial snap and the radial components of steam pressure, however, is resisted by the friction forces set up by the inclined faces 20 and 21 of the bull ring 15 and packing ring 17, respectively, which are in contact. It may be said, therefore, that the expansion forces created by the pressure of the steam in the steam chest are partially neutralized or modified by the resistance to expansion created by the forces set up by the coacting inclined faces.

The magnitude of the pressure exerted by the ring against the wall of the surrounding cage is dependent upon three factors, namely, one, the snap of the ring, two, the relative area of the faces 21, 22 and 24 of the packing ring, and, three, the angle of inclination of the ring face 21. It is obvious that by increasing or decreasing the angle of inclination of the coacting faces 20 and 21 the magnitude of the wall pressure will be decreased or increased accordingly. Furthermore, it is obvious that the magnitude of the wall pressure may also be varied to some extent by changing the areas of the axial and radial ring faces 24 and 22, respectively. Since the pressure of the steam in the chest is relatively high and constant during the stroke of the piston, it is desirable to use angles of inclination that are relatively high. In the drawings I have shown the ring 17 as having inclination angles of aproximately 45 degrees. These angles, however, may be varied dependent, of course, upon existing conditions.

Figure 4:
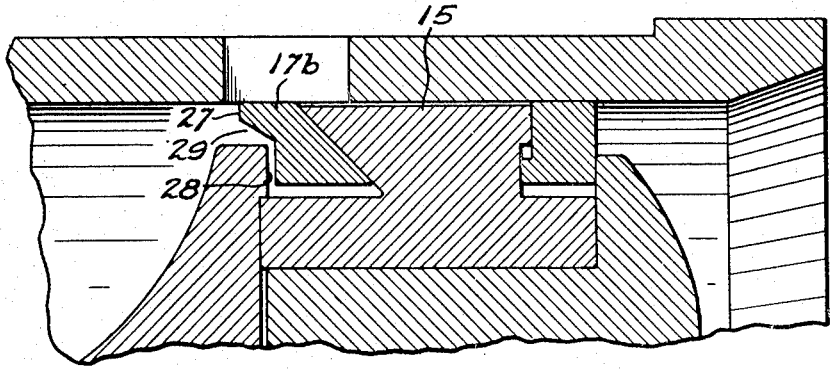
Figure 4 is a fragmentary section similar to Figure 3 showing one modification of the packing ring.

In Figure 4 I have shown a modified type of the steam ring 17.

In Figure 4 the ring 17b is of the modified L type, having a portion 27 extending beyond the radial face 28 of the valve body. The inner face of this portion 27 is inclined toward the radial face 22 of the packing ring and provides with the end of the valve body a circumferential pocket 29 for receiving the steam and directing it between the ring and piston valve.

In each of the constructions shown in Figures 3 and 4, the steam ring is mounted within its recess with material axial and radial clearances which permit the proper action of the pressure of the steam on the axial and radial faces 24 and 22 of the steam ring, whereby the pressures tending toward excessive expansion are partially neutralized by the contacting inclined faces 20 and 21.

Furthermore, the steam rings described are boxed in during the assembly of the piston valve parts by the bull ring 15 and end of the valve body so that in the case of breakage the broken parts of the ring will be held from entering or interfering with the valve cage ports 8.

It will be seen that the circumferential sealing face 23 is relatively narrow and that the inner circumferential face against which the pressure of the steam acts, is considerably wider. However, the width of the outer circumferential face 23 can be increased in the manner shown in Figure 4.

One of the advantageous features that results from the use of the ring of the present invention is that the ring has a substantial floating action within its surrounding recess, which results in the proper alignment of the packing ring with the surrounding wall, and thereby prevents wearing off of the corners of the packing ring which might eventually permit steam to leak past the packing ring.

Another advantage is that the wear of the portions of the cages bridging the ports 8 is materially reduced, thereby eliminating dishing out of these bridging portions. In the use of conventional rings the pressure of the ring on the cylinder wall is relatively great, and causes, because of the smaller area of the cage in the plane of the ports 8, a greater wear on these portions than on the other portions of the cage. By using the rings of the present invention, the degree of wear of these bridging portions for a given period of time is materially reduced, due to the lesser pressure on the cylinder wall.

Figure 2:
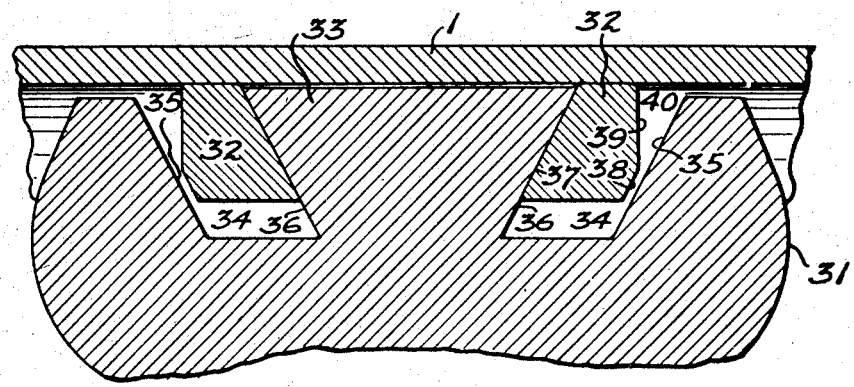
Figure 2 is an enlarged fragmentary section taken through the main piston assembly and showing the piston and the packing ring construction in detail.

As previously stated, the packing ring of the present invention also extends to the main piston assembly. In Figures 1 and 2, I have shown the invention incorporated in the main piston 2. The piston 2 embodies a disc 30 carried by the piston rod 3 to which an annular member 31 is rigidly secured. This member carries two packing rings 32 mounted in opposed relation since the high pressure steam acts alternately against opposite sides of the piston. These rings function to seal both the exhaust and live steam pressure.

Packing ring grooves are arranged at each side of the central portion 33 of the member 31, and it is to be noted that the portions of the member 31 outwardly of the grooves 34 are of lesser diameter than the central portion 33.

The outer and inner side walls 35 and 36, respectively, of each groove are inclined from their periphery toward the side walls of the other groove at a substantial angle as shown in Figure 2. Each packing ring 32 is of the split type and has an inner lateral face 37 inclined to substantially the same degree as the groove wall 36, and an outer lateral face that has a relatively narrow face portion 38 inclined to substantially the same angle as the groove side wall 35, and a substantially radial face portion 39 extending radially outwardly from the inclined portion 38. In some cases, the inclined portion 38 may be omitted, leaving only one inclined face and thus presenting a ring of substantially trapezoidal shape.

Each ring 32 is mounted in its groove with material radial and axial clearances as shown in Figure 2 to permit the pressure of the steam to act both radially and axially against the packing ring. It is to be noted that the groove walls 35 and the radial portions 39 of the ring diverge toward the periphery and provide a substantial pocket 40 therebetween. The outer ends of the member 31 are of lesser diameter than the central portion 33, and thereby, because of their clearance with the cylinder wall, permit a flow of steam through the pocket 40 and clearance space between the ring and groove walls 35, and into the space between the ring and bottom of the groove. The rings 32 are provided with an initial snap sufficient to cause the ring to engage with the cylinder wall, and the angles of inclination of the sides of the ring and corresponding sides of the groove walls are such that, during the operation of the piston, the resultant radial component of expanding pressure produced by the initial snap of the ring and the radial components of steam pressure are resisted and materially modified by the frictional forces created between the rings and inner walls 35 of the grooves, so that the cylinder wall pressures will provide an adequate seal, but will not create excessive frictional forces which tend to wear both the outer faces of the ring and cylinder wall. It may, therefore, be said that the ring, during the action of the high pressure steam, is maintained in a partially balanced condition. This ring, like the steam valve rings previous described, has a substantial floating action because of the material axial and radial clearances which tend toward efficient and proper alignment of the ring in the cylinder.

It is to be noted that the two rings 32 are of the same construction, but are mounted in opposition to each other, so that when one of the rings is operating on its power stroke to seal the high steam pressures, the opposite ring is operating in the same manner with different forces to maintain a seal. Consequently, for the major part of each cycle both rings are under variable pressures, and the pocket 40, together with the clearance space between the ring and outer groove wall, is utilized to control the expansion of the ring.

The exhaust steam pressures are considerably less than the driving pressures and it is obvious that the sealing wall pressure for the high steam pressures is higher than necessary for the exhaust steam pressures. By utilizing the piston and packing ring assembly of the present invention, the cylinder wall pressure during the exhaust stroke of each packing ring is materially reduced, but sufficient to maintain an adequate seal with a minimum of wall friction. As a result the wear of both the cylinder wall and the packing rings is of materially lesser magnitude than when conventional rings are employed, in which case the cylinder wall pressures created by the rings and steam pressures are excessive during the exhaust and power movement.

When each ring is operating during its exhaust stroke, a pressure is maintained in the pocket 40 and the space in back of the ring which tends to keep the ring engaged with the cylinder wall and with the inner groove wall 36, ready for the power stroke. The seat provided between the rings 32 and inner walls 35 of the ring grooves may be arranged at any desired angle of inclination and may be of any suitable width, depending somewhat upon the existing conditions.

When wear takes place in conventional rings and groove walls, excessive steam pressures are set up back of the rings, thereby causing excessive pressures against the cylinder walls which result in greater wear on the walls, ring faces and cylinders and less lubrication. In the present invention, however, the controlling of the pressure of the ring against the cylinder wall and the floating action of the ring result in less pressure on the cylinder wall and consequently less wear while maintaining an adequate seal between the piston and cylinder, even after the rings and groove walls have become worn.

Due to the material axial clearance, the rings of the present invention for both the piston and piston valve are preferably mounted within the grooves with their ends in abutting relation to provide a substantially continuous circumferential seal with the cylinder walls, thus preventing substantial leakage of steam between the ends of the ring.

It is thus seen that the present invention is applicable to both the main piston and piston valve assemblies, and that in each case the action of the ring is practically the same, that is, the expansive tendencies of the ring due to steam pressures are partially neutralized by the contact between the ring and the piston.

In the appended claims, it is to be understood that the terms "cylinder walls" and "pistons" include not only the main cylinder and piston but also the piston valve and surrounding cage previously described.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A piston and packing ring assembly for a steam engine cylinder, comprising a piston body having a cylindrical portion and spaced radial flanges extending radially outwardly from said cylindrical portion, an endless, relatively inexpansible bull ring surrounding said cylindrical portions and disposed between said flanges, said bull ring defining with one of said flanges a circumferential packing ring groove, the face of said flange adjacent said bull ring forming one side wall of said groove and said bull ring forming the other side wall and the bottom of said groove, said last mentioned side wall being inclined in the direction of action of the steam in the cylinder, and from its periphery toward the axis of said groove, and an imperforate steam packing ring having its side faces inclined with respect to each other, the side face of the ring adjacent said inclined groove side wall being inclined to substantially the same angle as said inclined groove side wall, said packing ring being mounted in said groove with material axial and radial clearances, said axial clearance being sufficient when said packing ring is in engagement with the cylinder and said inclined groove side wall to prevent engagement between said packing ring and the other groove side wall.

2. A piston valve and ring assembly for steam engines, comprising a cylindrical body portion having radial abutment flanges at its ends, end members having axial flanges abutting against said abutment flanges and radial flanges spaced from said abutment flanges, bull rings mounted on said axial flanges and positioned between the radial flanges of said body portion and end members each of said bull rings forming with the adjacent abutment flange a steam ring groove and with the adjacent end member flange an exhaust ring groove, the faces of said bull rings forming the side walls of said steam ring grooves being inclined from their peripheries toward the axis of the assembly and in the direction of action of steam, exhaust rings mounted in said exhaust ring grooves and imperforate split steam rings mounted in said steam ring grooves, each of said steam rings having their side faces inclined with respect to each other, the side faces of said rings adjacent said inclined groove side walls being inclined to substantially the same angle as the inclined groove side wall of its adjacent bull ring and being mounted in its groove with material axial and radial clearances, the axial clearances of said rings being sufficient when the same are in engagement with the cylinder and with the inclined groove side walls to prevent engagement between the steam rings and the opposite groove side walls.

GEORGE H. ROBERTS.